(12) United States Patent
Schmieder et al.

(10) Patent No.: US 7,765,483 B2
(45) Date of Patent: Jul. 27, 2010

(54) FILTERING OBSCURED DATA FROM A REMOTE CLIENT DISPLAY

(75) Inventors: Robert Wilhelm Schmieder, Snoqualmie, WA (US); Elton Saul, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/304,299

(22) Filed: Dec. 15, 2005

(65) Prior Publication Data

US 2007/0061399 A1    Mar. 15, 2007

Related U.S. Application Data

(60) Provisional application No. 60/716,364, filed on Sep. 12, 2005.

(51) Int. Cl.
*G06F 3/00*    (2006.01)
(52) U.S. Cl. .................................. 715/751; 715/753
(58) Field of Classification Search ................ 715/751, 715/753
See application file for complete search history.

(56) References Cited

U.S. PATENT DOCUMENTS

| | | | | |
|---|---|---|---|---|
| 5,758,110 A | * | 5/1998 | Boss et al. ................... | 715/751 |
| 5,872,924 A | * | 2/1999 | Nakayama et al. ........... | 709/205 |
| 5,996,002 A | * | 11/1999 | Katsurabayashi et al. ... | 709/204 |
| 6,125,369 A | * | 9/2000 | Wu et al. ..................... | 707/201 |
| 6,285,363 B1 | * | 9/2001 | Mairs et al. .................. | 715/751 |
| 6,343,313 B1 | * | 1/2002 | Salesky et al. ............... | 709/204 |
| 6,704,024 B2 | * | 3/2004 | Robotham et al. ........... | 345/581 |
| 6,911,987 B1 | * | 6/2005 | Mairs et al. .................. | 345/557 |
| 7,197,751 B2 | * | 3/2007 | Fedotov et al. .............. | 719/323 |
| 7,222,305 B2 | * | 5/2007 | Teplov et al. ................ | 715/751 |
| 7,251,822 B2 | * | 7/2007 | Agarwal et al. .............. | 726/1 |
| 7,372,595 B1 | * | 5/2008 | Lyon et al. ................... | 358/1.9 |
| 7,464,338 B2 | * | 12/2008 | Sato ............................. | 715/750 |
| 7,644,085 B2 | * | 1/2010 | Miller et al. ................. | 709/208 |
| 7,660,799 B2 | * | 2/2010 | Saigo et al. .................. | 709/216 |
| 2002/0087633 A1 | | 7/2002 | Nelson ......................... | 709/204 |

(Continued)

OTHER PUBLICATIONS

Richard Han, Veronique Perret, and Mahmoud Naghshineh; WebSplittter: A Unified XML Framework for Multi-Device Collaborative Web Browsin; 2000; pp. 1-10—retrieved from: http://web.archive.org/web/20040531131028/http://www.cs.colorado.edu/~rhan/CSCI_7143_002_Fall_2001/Papers/Han2000_WebSplitter.pdf.*

(Continued)

*Primary Examiner*—William L Bashore
*Assistant Examiner*—David Phantana-angkool
(74) *Attorney, Agent, or Firm*—Workman Nydegger

(57) ABSTRACT

Present implementations include one or more applications at a sending computer system that generate data intended for display at a receiving computer system over a network connection. A mirror driver at the sending computer system renders shared data in a bitmap, which is sent to the receiving computer system. The mirror driver also renders one or more simple image files in place of unshared data that is not intended for display, and sends the replacement images to the receiving computer system. The receiving computer system, in turn, renders what it receives using its existing resources. In one implementation, a driver interface mediates at the sending computer system between the one or more applications generating data, one or more display drivers, and the mirror driver. Thus, the driver interface can pass data to a normal display driver, and also to the mirror driver, which then filters the data as appropriate.

21 Claims, 3 Drawing Sheets

U.S. PATENT DOCUMENTS

| | | |
|---|---|---|
| 2003/0105819 A1 | 6/2003 | Kim et al. .................... 709/205 |
| 2003/0188198 A1 | 10/2003 | Holdsworth |
| 2007/0061399 A1* | 3/2007 | Schmieder et al. .......... 709/204 |
| 2007/0174429 A1* | 7/2007 | Mazzaferri et al. .......... 709/218 |
| 2007/0179955 A1* | 8/2007 | Croft et al. ..................... 707/9 |
| 2007/0180493 A1* | 8/2007 | Croft et al. ..................... 726/2 |
| 2007/0198656 A1* | 8/2007 | Mazzaferri et al. .......... 709/218 |
| 2007/0282951 A1* | 12/2007 | Selimis et al. .............. 709/205 |

OTHER PUBLICATIONS

Swift et al., "Improving the Granularity of Access Control in Windows NT", Microsoft Corporation, ACM Workshop on Role Based Access Control: Proceedings of the Sixth ACM Symposium on Access Control Models and Technologies, 2001, pp. 87-96.

* cited by examiner

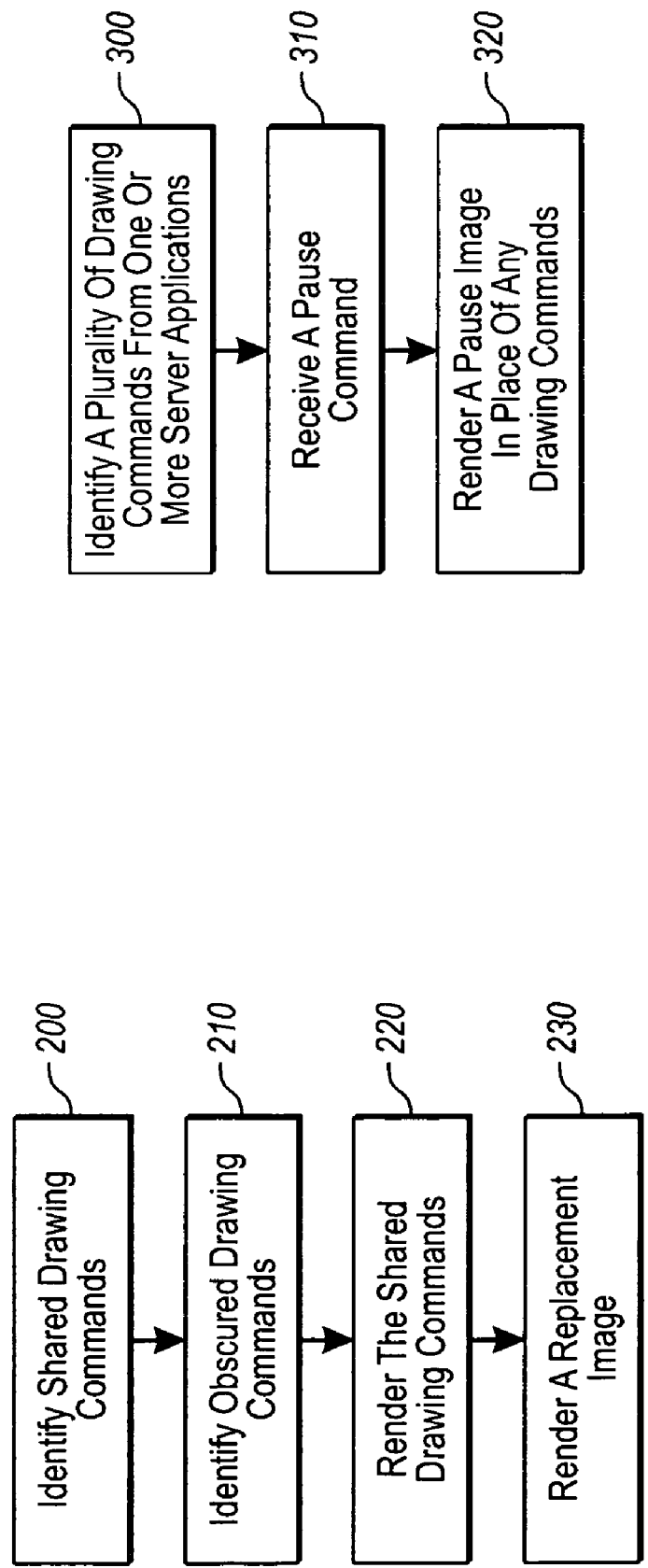

US 7,765,483 B2

FILTERING OBSCURED DATA FROM A REMOTE CLIENT DISPLAY

CROSS-REFERENCE TO RELATED APPLICATIONS

The present invention claims the benefit of priority to U.S. Provisional Patent Application No. 60/716,364, filed on Sep. 12, 2005, entitled "Filtering Content in Remote Sharing Environments," the entire contents of which are incorporated herein by reference.

BACKGROUND

Background and Relevant Art

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources on a network have also increased.

Some current ways for distributing resources within an organizational network include centralized computing scenarios, which might involve a centralized network server sharing resources with one or more clients that do not have those resources installed locally. One such protocol that has been used for this type of functionality is the Remote Desktop Protocol ("RDP"). With the Remote Desktop Protocol, a client computer system can access a centralized network server, which hosts resources of interest. The client computer system can also interact (e.g., sending mouse and keyboard events, etc.) with those resources just as though those resources were installed locally.

The network server in turn, processes those interactions, creates corresponding rendering information of the data using its own video driver, and sends both the processed data and created rendering information back to the client. The client computer system then receives the data and rendering information, and uses a client-side video driver to render and display the received data locally. Ideally, this interaction between the client computer system and network server occurs seamlessly as though the client computer system had actually processed the data locally with its own installed resources. Unfortunately, such systems can be subject to network throughput constraints, which, if burdened, might result in a "lag" between what the local client computer system views in terms of interaction and processing. Furthermore, such systems do not typically have a concept of "shared" and "unshared" resources, such that some windows at the server can be viewed by a local client, but not others. Rather, everything that is open at the network server for the client session can be delivered to the client computer system.

Another type of system that is similar in some respects to the centralized sharing model described above involves a broadcasting (or "sending") client computer system configured to send window data information to other recipient client computer systems on a network. This feature is also sometimes called "desktop sharing." In this example, the broadcasting computer (e.g., an "instructor" in a learning environment) and the recipient computer systems (e.g., "students") connect using a commonly-installed application program that allows for sharing of desktop views and locally installed applications at the instructor computer. Similar to the centralized computing system scenario, the client computer systems might be able to interact with the windows displayed at the instructor computer as though the windows were the student computer's own.

In contrast with the client-server model using RDP described above, this system can implement the concepts of shared and unshared window data. For example, the instructor might not want to share all its open windows (e.g., an Internet browser opened to a bank account) with the student, and thus might designate that the window containing the solution is shared, while the window containing sensitive information is unshared. Nevertheless, the instructor's computer system will still encode data from the unshared window, and then send both the shared and unshared window data to the student's computer system. As a result, the student's computer system will render the shared windows correctly, but will be unable to render the unshared window data due to its unique encoding, despite trying to process it. Thus, the student's computer system might produce some default generic lines and squares where the unshared window data would otherwise be displayed.

Similar to the centralized RDP model described above, this instructor/student (i.e., sender/receiver) type of system also has some disadvantages that make it difficult to apply to centralized desktop sharing environments. For example, such a system typically requires both the sending and receiving programs to have the same application programs and corresponding updates installed locally so that shared and unshared concepts are appropriately managed. In addition, there are certain inefficiencies when encoding unshared data, then requiring the receiving computer to attempt to decode the unshared window data, and make a determination on what to display when the rendering is unsuccessful. Furthermore, security concerns can be present when sending the unshared —albeit encoded—data, since there could still be a possibility that an unscrupulous agent might capture this unshared data and successfully decode it By contrast, it is not a simple matter to just update the protocol, such as RDP, for consideration of the concepts of shared and unshared window data. In particular, updating such a protocol typically involves an administrator needing to take the time to provide and install corresponding extensions at both the server and each client computer system that is sharing resources from the server over the protocol.

Accordingly, there are a number of aspects of current resource sharing protocols that make it difficult to combine the advantages of such protocols in a desktop sharing environment.

BRIEF SUMMARY

Implementations of the present invention solve one or more of the foregoing problems in the art with systems, methods, and computer program products that enhance the efficiency of application display sharing between networked computer systems. In particular, at least one implementation of the present invention involves a server, or sending computer, identifying areas of a display screen that are meant to be shared, as well as those that are meant not to be shared. The server can then substitute the unshared content with one or more simple image files, and transmit the sample image files in place of the unshared content. As such, sensitive information can be obscured without necessarily requiring any significant processing action from the client computer system.

For example, one method of filtering shared and obscured application commands in accordance with one or more implementations of the present invention involves identifying one or more shared drawing commands that are intended to be displayed at least at a remote client. The method further involves identifying one or more obscured drawing commands that are intended to be hidden from the remote client. In addition, the method involves rendering the one or more shared drawing commands in a bitmap, as well as rendering a replacement image of the one or more obscured drawings commands in the bitmap. As such, the replacement image can be sent in place of content that is intended to be obscured.

In addition, a method of implementing a pause feature when sharing a display with a remote client can involve identifying a plurality of drawing commands from one or more applications at a server system. In this case, at least one of the plurality of drawing commands is intended to be displayed at a client computer system. In addition, the method involves receiving pause instructions from any of the one or more applications at the server, as well as a mirror driver rendering a corresponding pause image in a bitmap. As such, the pause image can be sent to the client computer system in place of any of the plurality of drawing commands.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flowchart of a sequence of acts in a method of filtering shared and obscured drawing commands in an application sharing environment in accordance with an implementation of the present invention; and FIG. 3 illustrates a flowchart of a sequence of acts in a method of implementing a pause feature in an application sharing environment in accordance with an implementation of the present invention.

DETAILED DESCRIPTION

Implementations of the present invention extend to systems, methods, and computer program products that enhance the efficiency of application display sharing between networked computer systems. In particular, at least one implementation of the present invention involves a server, or sending computer, identifying areas of a display screen that are meant to be shared, as well as those that are meant not to be shared. The server can then substitute the unshared content with one or more simple image files, and transmit the simple image files in place of the unshared content. As such, sensitive information can be obscured without necessarily requiring any significant processing action from the client computer system.

As will be understood more fully from the specification and claims, this filtering can be done using very simple remote viewing protocols, without necessarily involving extensive processing from either the server side or the client side. Generally, the terms "remote view," "remote viewing," or "remote sharing" refer to the general concept of one computer system viewing at least some of the display screen data of another remotely located computer system. The remote viewing functionally described herein can also allow fairly granular display and obscured-display information to be transmitted to a receiving computer system without necessarily requiring any significant network bandwidth. Furthermore, this communication of shared and obscured application areas through remote viewing procedures can be done using existing protocols, such as remote desktop protocol (i.e., "RDP"), without necessarily requiring significant changes to—and related management of—the protocol at either the server or client side.

Figure 1A:
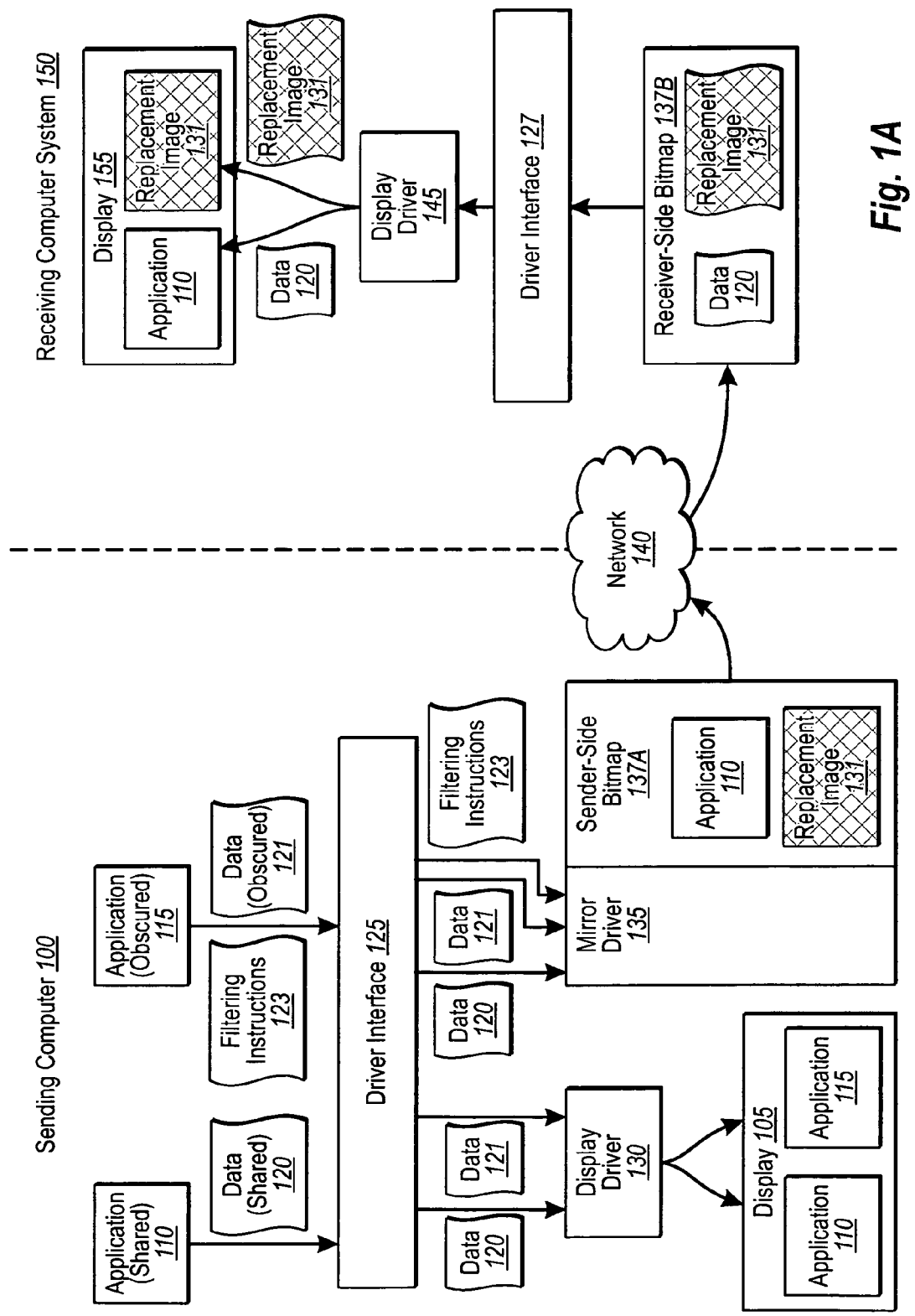
FIG. 1A illustrates an overview schematic diagram in which a driver interface filters drawing commands from a shared application and from an obscured application in an application sharing environment in accordance with an implementation of the present invention.

As shown in FIG. 1A, for example, a sending computer 100 communicates application data to receiving computer 150 over a network 140. For example, the receiving computer 150 (e.g., a client computer system) connects with sending computer 100 (e.g., a server computer system) to share various resources, such as application 110, which receiving computer 150 will display locally at display 155. Alternatively, an end user at sending computer 100 shares a display screen with an end user at receiving computer 150, where the sending computer 100 display screen 105 includes a view of application 110 data as well as application 115 data. In any event, at least a portion of what is viewable at sending computer 100 display screen 105 is intended to be viewable at receiving computer 150 display screen 155. In addition, FIG. 1A shows that application 110 is shared while application 115 is obscured. For example, application 115 might be accessed by another receiving computer system (not shown), or, alternatively, represents data that an end-user at sending computer 100 does not want to show to receiving computer 150, such as a browser opened to a bank account, etc.

When application 110, 115 performs a drawing operation that results in a visible change at display 105, driver interface 125 will pass this data to display driver 130. In one implementation, driver interface 125 is a device interface component, such as a Graphics Device Interface ("GDI"), which takes graphical function calls from an application program, and provides corresponding graphical instructions to the appropriate device driver. Generically, driver interface 125 can be any computer program code capable of intermediating between an application program and a display driver, and further configured in some cases to provide a filtering function as described more fully below.

For example, FIG. 1A shows that driver interface 125 receives shared display data 120 from shared application 110, and receives obscured display data 121 from obscured application 115. Generally, data 120 and 121 comprise at least geometric drawing data, which can be used to render an image generated by the corresponding application. Driver interface 125 then identifies the correct display driver for local display, in this case driver 130, and passes data 120 and 121 to the identified display driver. Display driver 130 can then render the data and displays it locally at server display 105, as is typically the case. In particular, driver interface 125 does not need to provide any local filtering information or functionality since the applications are hosted and viewed locally at server 100.

FIG. 1A also shows that driver interface 125 communicates with mirror driver 135, which is a "remote view" driver, such as an RDP driver, to provide it with drawing commands received from applications 110, 115. In general, a mirror driver 135 can be any type of component or module capable of receiving duplicate drawing commands, the original of which were intended for one display device driver, and rendering those drawing commands in a duplicate (or "mirrored") fashion. As shown, for example, mirror driver 135 receives drawing commands from driver interface 125, just as those commands are also sent to display driver 130.

FIG. 1A also shows, however, that driver interface 125 sends shared data 120 to mirror driver 135, just as provided to display driver 130, but also sends filtering instructions 123 to mirror driver 135 along with obscured data 121. In one implementation, driver interface 125 may also be configured only to send such drawing instructions to mirror driver 135 if the instructions pertain to a certain region of, for example, a shared display screen. In any event, filtering instructions 123 can comprise geometric instructions for the unshared application 115, along with a notation that data 121 are not shared, or can include any image file chosen by application 115 (or by application 110, or a different component—not shown). Upon receipt, mirror driver 135 processes data 120 and 123, and creates corresponding drawings in sender-side bitmap 137a.

In this case, however, mirror driver 135 draws an image in sender-side bitmap 137a corresponding to data 120 (i.e., "Application 110"); and, based on the new instructions in message 123, prepares an alternative replacement image 131 in sender-side bitmap 137a in place of obscured data 121. Sending computer 100 then prepares these images as graphics commands in accordance with an appropriate protocol (e.g., RDP), and prepares corresponding network packets of these graphics commands. Sending computer 100 then sends these network packets over network 140, ultimately to corresponding receiver-side bitmap 137b at receiving computer 150. In addition to the raw data corresponding to drawing commands, these network packets can also include instructions accompanying replacement image 131, such as whether to tile, stretch, or otherwise display replacement image 131 in some specific way.

At receiving computer 150, a corresponding viewer application (not shown) reads, from receiver-side bitmap 137b, the data stream of network packets as data 120 and replacement image 131 (and corresponding display instructions), and forwards this data to driver interface 127. Depending on the protocol used (e.g., as with RDP), receiving computer 150 can also cache replacement image 131 for later use, or replace replacement image 131 with some other image it would prefer to use instead. Driver interface 127, in turn, passes the data to display driver 145, which then renders the data for display at client display screen 155. As such, client display screen 155 shows an identical copy of application 110, much like at sending computer display screen 105. Nevertheless, in contrast with display screen 105, display screen 155 shows the filtering instructions 123 (or some other chosen replacement image) in place of application 115, since application 115 is obscured.

Thus, sending computer 100 performs substantially all of the relevant processing for determining obscured and or shared application data areas, and leaves receiving computer system 150 to simply read and render what it has received. This allows receiving computer system 150 to simply perform the functions it is already well-equipped to do, such that the receiving computer system does not need to receive additional updates or extensions to its installed resources. Furthermore, this allows implementations of the present invention to be readily compatible with older versions of remote viewing client/server models and/or related protocols.

An additional aspect of the principles described above is that data filtration can be tracked in kernel-mode by the driver interface and/or corresponding drivers, rather than in user-mode via the application(s). As such, the various drivers can act essentially as synchronizing and funneling agents that render and send images based on an immediate understanding of what is or is not to be shared. For example, when an application receives an identification that it is supposed to be shared or unshared, that designation can be immediately associated with the application's outgoing data (e.g., 120, 121), and further directed to mirror driver 135 as well as driver interface 125. At the moment mirror driver 135 receives an indication that application data is not to be shared, mirror driver 135 can immediately draw or replace content to be obscured with some default image in sender-side bitmap 137a. Thus, since synchronization of shared and unshared concepts with received data can be done at mirror driver 135, mirror driver 135 can avoid conditions where it is sending unshared data due to some delay in receiving synchronization information from the application.

Figure 1B:
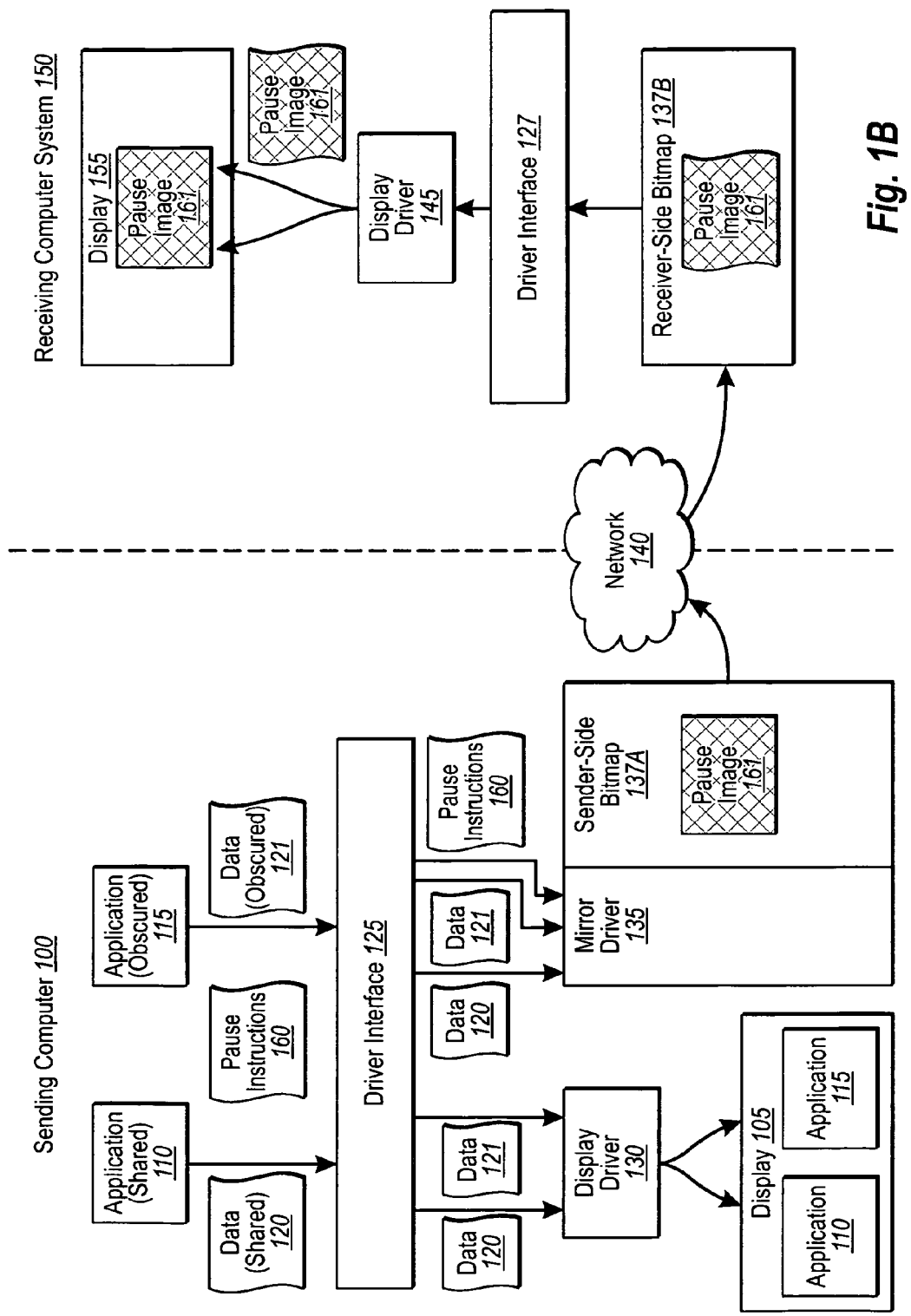
FIG. 1B illustrates an overview of the schematic diagram shown in FIG. 1A in which the driver interface responds to pause instructions received from an application.

FIG. 1B illustrates an alternative way in which the aforementioned technology can be implemented in a remote viewing or sharing environment. In particular, FIG. 1B shows how a broadcasting computer system, such as an instructor using a sending computer 100 in a learning environment, can pause a presentation using the simple remote sharing protocol, such as RDP. The pause command can be implemented in such a way that all data is obscured by a replacement image, prior to being sent to any one or more corresponding receiving computer systems, such as receiving computer 150.

For example, FIG. 1B shows that driver interface 125 receives any shared and obscured data 120, 121, as in FIG. 1A. In the illustrated case, however, driver interface 125 also receives pause instructions 160, such as from shared application 110 using a collaboration API. Driver interface 125 then passes data 120 and 121 to display driver 130, as before, and also passes data 120 and 121, as well as pause instructions 160 to mirror driver 135 via driver interface 125. Pause instructions 160 might be used in cases, for example, where a sending user, such as an instructor, might be changing an application used in a presentation, which is at the foreground of an application he intends to hide. Rather than momentarily expose the hidden application when closing and opening new windows or applications, the instructor would like to cover the receiving computer system's entire display screen with a momentary pause image. Accordingly, the instructor requests the relevant application to send pause instructions 160.

Upon receipt, driver interface 125 passes along any application data being sent from applications 110, 115, and also passes along pause instructions 160 to mirror driver 135. Instructions 160 can be based on what the relevant application (e.g., 110 and/or 115) identifies regarding the borders of what is presently being displayed, and subsequent preparation of instructions to replace at least a portion between those borders with an appropriately chosen pause image. Upon receipt, mirror driver 135 can replace data 120 and 121 with pause image 161.

In any event, mirror driver draws an appropriate pause image in sender-side bitmap 137a, where pause image 161 replaces some or all of data 120 and 121. As discussed in FIG. 1A, sending computer 100 then sends this data in network packet form over network 140 to receiver-side bitmap 137b. Receiving computer 150 then reads, relays, and renders this data as appropriate, and ultimately displays pause image 161 at display 155. Furthermore, receiving computer 150 can cache pause image 161 for later use, and can also substitute pause image 161 with another appropriately chosen pause image, as desired. However rendered and displayed, receiving computer 150 is nevertheless unable to display content that sending computer 100 specifically intended to be hidden or obscured, at least in part since it has not been received from sending computer 100 in the first instance.

For example, the schematic diagrams of FIGS. 1A-1B and corresponding text provide a number of components and means by which the concepts of shared and obscured (or unshared or hidden) data can be implemented in a desktop sharing environment. Implementations of the present invention can also be described in terms of a sequence of acts for accomplishing a method. For example, FIGS. 2 and 3 illustrates flowcharts of a series of acts in methods of filtering shared and obscured application drawing commands, and for implementing a pause feature in a remote viewing environment, respectively. FIGS. 2 and 3 are described below with further reference to the components and modules of FIGS. 1A-1B.

In particular, FIG. 2 shows that a method at a sending computer of filtering shared and obscured application drawing commands comprises an act 200 of identifying shared drawing commands. Act 200 includes identifying one or more shared drawing commands intended to be displayed at a remote client. For example, driver interface 125 receives drawing commands 120 from shared application 110. The drawing commands 120 are associated with an instruction indicating that the image defined by the drawing commands is shared, or viewable by receiving computer 150. Furthermore, FIG. 2 also shows that the method comprises an act 210 of identifying obscured drawing commands. Act 210 includes identifying one or more obscured drawing commands intended to be hidden from the remote client. For example, mirror driver 135 (whether via interface 125, or directly from application 115) receives data 121, which represents drawing commands that are intended to not be displayed at receiving computer 150.

In addition, FIG. 2 shows that the method comprises an act 220 of rendering the shared drawing commands. Act 220 includes rendering the one or more shared drawing commands in a bitmap. For example, mirror driver 135 receives data 120 directly from application 110, or via driver interface 125. Since mirror driver 135 understands that this is shared content, mirror driver 135 draws this data into sender-side bitmap 137a (i.e., the image of application 110), and prepares it to be sent out over network 140 in packet form.

Furthermore, the method comprises an act 230 of rendering a replacement image. Act 230 includes rendering a replacement image of the one or more obscured drawings commands in the bitmap, such that the replacement image can be sent in place of content that is intended to be obscured. For example, mirror driver 135 receives data messages 120 and 121, as well as filtering instructions 123, which indicate geometric data regarding obscured boundaries in a display, and that the data contained in messages 120 and 121 are not meant for display. Alternatively, filtering instructions 123 contain an actual replacement image 131 to be used in place of data 120 and 121. Accordingly, mirror driver 135 draws replacement image 131 in sender-side bitmap 137a.

FIG. 3 illustrates a similar but alternative method in accordance with an implementation of the present invention, which includes filtering shared and/or obscured application drawing information when implementing a pause feature. For example, FIG. 3 shows that the method comprises an act 300 of identifying a plurality of drawing commands from one or more server applications. Act 300 includes identifying a plurality of drawing commands from one or more applications at a server, at least one of the plurality of drawing commands being intended to be displayed at a client computer system. For example, as shown in FIG. 1B, mirror driver 135, such as via driver interface 125, receives any of data 120 and 121 messages from applications 110, 115, etc. This information may be received, for example, during a presentation sent from sending computer 100 to one or more other receiving computer systems over network 140.

In addition, FIG. 3 shows that the method comprises an act 310 of receiving pause instructions. Act 310 includes receiving pause instructions from any of the one or more applications at the server. For example, driver interface 125 of server 100 receives pause instructions 160, and passes them directly onward to mirror driver 135. Alternatively, mirror driver 135 receives pause instructions 160 directly from application 110 or 115. Furthermore, FIG. 3 shows that the method comprises an act 320 of rendering a pause image in place of any drawing commands. Act 320 includes rendering a pause image in a bitmap, such that the pause image is sent to the client computer system in place of any of the plurality of drawing commands. For example, FIG. 1B shows that driver interface 125 sends pause image 161 (or corresponding instructions of the same) to mirror driver 135. Mirror driver 135 then draws the data 160 in sender-side bitmap 137a, before data 160 are packetized and sent to receiving computer 150 over network 140.

Accordingly, implementations of the present invention provide a number of components and methods for efficiently rendering shared and unshared (or obscured) data corresponding to data sent from shared or unshared applications. In particular, implementations of the present invention provide a number of advantages in the art since much of the processing that needs to occur is generally more simple than otherwise available. Furthermore, the more complicated aspects of the processing only need to occur at the sending computer. As such, implementations of the present invention can be readily adapted to systems that already incorporate remote sharing protocols, such as RDP, and can provide much richer share/unshared display information without necessarily requiring updates or extensions to existing resources and protocols.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized system in which a sending computer system is configured to share a desktop view with a receiving computer system over a network connection, a method of filtering shared and obscured application drawing commands at the sending computer system, comprising the acts of:
   identifying one or more shared drawing commands, the shared commands intended to be displayed at both the sending computer system and a receiving computer system;
   identifying one or more obscured drawing commands, the obscured drawing commands intended to be displayed at the sending computer system but intended to be hidden from the receiving computer system;
   a driver interface receiving both the shared commands and the obscured commands;
   the driver interface identifying a display driver on the sending computer system;
   the driver interface passing the shared commands and the obscured commands to the display driver on the sending computer system;
   the display driver on the sending computer system rendering the shared commands and the obscured commands;
   displaying the rendered shared commands and obscured commands at a local display;
   the driver interface identifying a mirror driver, the mirror driver being a remote view driver and the mirror driver resident on the sending computer system;
   the driver interface passing the shared commands and the obscured commands to the mirror driver;
   the driver interface passing filtering instructions comprising a notation indicating that certain data is not shared data;
   the mirror driver rendering the one or more shared drawing commands in a sender-side bitmap;
   based on the filtering instructions, the mirror driver rendering a replacement image in the bitmap, such that the replacement image can be sent in place of the one or more obscured drawing commands to the receiving computer system;
   the sending computer system preparing images in the sender-side bitmap as graphics commands in accordance with a protocol;
   the sending computer system preparing network packets comprising the graphics commands and the rendered replacement image; and
   sending the network packets to a remote display device.

2. The method as recited in claim 1, wherein the one or more shared drawing commands are also intended to be displayed at the sending computer.

3. The method as recited in claim 1, wherein the one or more obscured drawing commands are also intended to be displayed at the sending computer, but not at the receiving computer system display.

4. The method as recited in claim 1, further comprising the mirror driver receiving the replacement image and replacing at least one obscured drawing command with the replacement image.

5. The method of claim 1, wherein the driver interface and the mirror driver operate in kernel mode.

6. The method of claim 1, further comprising the display driver on the sending computer system rendering each of the shared commands and each of the obscured commands at a local display.

7. The method of claim 1, further comprising:
   sending the replacement image to the mirror driver with the one or more obscured drawing commands, the replacement image being provided to the driver interface from an obscured application that generates the one or more obscured drawing commands.

8. The method of claim 1, further comprising receiving an indication at the mirror driver that the one or more shared drawing commands are now associated with an obscured application.

9. The method as recited in claim 8, further comprising substituting the rendered one or more shared drawing commands in the bitmap with the replacement image.

10. The method as recited in claim 1, wherein the mirror driver is a remote desktop protocol driver, the method further comprising an act of sending the rendered data to the receiving computer system as network packets over a remote desktop protocol.

11. The method as recited in claim 10, further comprising, at the receiving computer system:
   receiving the network packets from the sending computer system; and
   rendering the network packets for display, such that the one or more shared drawing commands are displayed, and the one or more obscured drawing commands are represented by the replacement image.

12. The method as recited in claim 1, further comprising the acts of:
   receiving pause instructions from an application that generated any of the one or more shared drawing commands or the one or more obscured drawing commands; and substituting at least a portion of any of the one or more shared drawing commands and the one or more obscured drawing commands with a pause image file.

13. The method of claim 12, wherein the mirror driver receives the pause command from the application, and wherein the mirror driver renders the pause image file in place of the any of the shared or obscured drawing commands in the bitmap.

14. At a sending in a computerized system in which the network server is configured to share a desktop view with a receiving computer system over a network connection, a computer program product comprising computer readable storage media having computer-executable instructions stored thereon that, when executed, cause one or more processors at the sending computer system to perform the method of claim 1.

15. The method of claim 1, further comprising:
the driver interface sending the one or more shared drawing commands to both the display driver for local display and the mirror driver; and
wherein the filtering instructions comprise geometric data.

16. The method of claim 15, further comprising the driver interface determining shared drawing commands pertaining to a particular region and sending the shared drawing commands to the mirror driver only if the commands pertain to the particular region of a shared display screen.

17. The method of claim 15, further comprising the mirror driver creating corresponding drawings in sender-side bitmap.

18. The method of claim 15, further comprising the mirror driver drawing an image in sender-side bitmap and, based on instructions sent by the driver interface with the drawing commands, preparing an alternative replacement image in sender-side bitmap.

19. The method of claim 15, further comprising the mirror driver, when receiving an indication that application data is not to be shared, immediately replacing content to be obscured with a default image in sender-side bitmap.

20. The method of claim 15, further comprising
the driver interface passing application data from applications to the mirror driver; and
the driver interface passing instructions to the mirror driver.

21. The method of claim 20, wherein the instructions identify the borders of a display image and instructions to replace at least a portion within the borders with a pause image.

* * * * *